(12) United States Patent
Verma et al.

(10) Patent No.: US 10,970,402 B2
(45) Date of Patent: Apr. 6, 2021

(54) DISTRIBUTED LEARNING PRESERVING MODEL SECURITY

(71) Applicant: International Business Machines Corporation, Armonk, NY (US)

(72) Inventors: Dinesh C. Verma, New Castle, NY (US); Supriyo Chakraborty, White Plains, NY (US); Changchang Liu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 16/164,846

(22) Filed: Oct. 19, 2018

(65) Prior Publication Data
US 2020/0125739 A1    Apr. 23, 2020

(51) Int. Cl.
*G06F 21/60* (2013.01)
*H04L 9/30* (2006.01)
*H04L 9/00* (2006.01)
*G06N 20/00* (2019.01)

(52) U.S. Cl.
CPC .......... *G06F 21/602* (2013.01); *G06N 20/00* (2019.01); *H04L 9/008* (2013.01); *H04L 9/30* (2013.01); *H04L 2209/12* (2013.01)

(58) Field of Classification Search
CPC ... G06F 21/602; G06F 21/6245; G06N 20/00; H04L 9/30; H04L 9/008; H04L 2209/12; H04L 9/0891; H04L 9/0894
See application file for complete search history.

(56) References Cited

U.S. PATENT DOCUMENTS

| 9,563,854 B2 * | 2/2017 | Cruz Mota | G06N 3/084 |
| 9,734,457 B2 * | 8/2017 | Vasseur | H04L 45/48 |
| 9,972,304 B2 * | 5/2018 | Paulik | G10L 15/30 |
| 10,462,172 B1 * | 10/2019 | Sadaghiani | G06F 9/542 |

(Continued)

FOREIGN PATENT DOCUMENTS

WO    2017176356 A2    10/2017

OTHER PUBLICATIONS

Zheng et al., "Attribute-Distributed Learning: Models, Limits, and Algorithms", Jan. 2011, IEEE Transactions on Signal Processing, vol. 59, No. 1, pp. 386-398 (Year: 2011).*

(Continued)

*Primary Examiner* — Matthew Smithers
(74) *Attorney, Agent, or Firm* — Jeffrey S. LaBaw; David H. Judson (57) ABSTRACT

Distributed machine learning employs a central fusion server that coordinates the distributed learning process. Preferably, each of set of learning agents that are typically distributed from one another initially obtains initial parameters for a model from the fusion server. Each agent trains using a dataset local to the agent. The parameters that result from this local training (for a current iteration) are then passed back to the fusion server in a secure manner, and a partial homomorphic encryption scheme is then applied. In particular, the fusion server fuses the parameters from all the agents, and it then shares the results with the agents for a next iteration. In this approach, the model parameters are secured using the encryption scheme, thereby protecting the privacy of the training data, even from the fusion server itself.

24 Claims, 4 Drawing Sheets

(56) References Cited

U.S. PATENT DOCUMENTS

| | | | | |
|---|---|---|---|---|
| 2015/0379424 | A1* | 12/2015 | Dirac | G06N 20/00 |
| | | | | 706/12 |
| 2018/0018590 | A1* | 1/2018 | Szeto | G06F 21/6254 |
| 2018/0212757 | A1* | 7/2018 | Carr | H04L 9/30 |
| 2018/0212775 | A1* | 7/2018 | Williams | G06F 21/6245 |
| 2018/0336486 | A1* | 11/2018 | Chu | G06N 20/00 |
| 2019/0158594 | A1* | 5/2019 | Shadmon | H04L 9/088 |
| 2019/0228338 | A1* | 7/2019 | Chapman | G06N 20/20 |
| 2020/0028862 | A1* | 1/2020 | Lin | H04L 63/1441 |
| 2020/0082259 | A1* | 3/2020 | Gu | G06N 3/08 |

OTHER PUBLICATIONS

Chakraborty et al., "Deep Learning for Situational Understanding", Jul. 2017, 20th International Conference on Information Fusion, pp. 1-8. (Year: 2017).*

Tuor et al., "Distributed Machine Learning in Coalition Environments: Overview of Techniques", 2018, 21st International Conference on Information Fusion, pp. 814-821. (Year: 2018).*

Khayut et al., "Modeling of Computational Perception of Reality, Situational Awareness, Cognition and Machine Learning Under Uncertainty", Sep. 2017, IEEE, Intelligent Systems Conference, pp. 331-340. (Year: 2017).*

Mohassel et al., "SecureML: A System for Scalable Privacy-Preserving Machine Learning", 2017, IEEE, pp. 19-38. (Year: 2017).*

Hrestak, et al., "Homomorphic encryption in the cloud," 37th International Convention on Information and Communication Technology, Electronics and Microelectronics (MIPRO), May 2014.

Hardy, et al, "Private federated learning on vertically partitioned data via entity resolution and additively homomorphic encryption," arXiv:1711.10677v1, Nov. 2017.

Wu, et al, "Privacy-preservation for stochastic gradient descent application to secure logistic regression," Jan. 2013.

Sit, et al, "A DHT-based backup system," MIT, Aug. 2003.

Kraska, et al, "MLbase: A Distributed Machine-learning System," CIDR 2013, Jan. 2013.

Peteiro-Barral, et al, "A survey of methods for distributed machine learning," Prog Artif Intell, vol. 2, 2013.

Ranjan, et al, "Streaming big data processing in datacenter clouds," IEEE Cloud Computing, 2014.

* cited by examiner

DISTRIBUTED LEARNING PRESERVING MODEL SECURITY

STATEMENT REGARDING SPONSORED RESEARCH

This invention was made with government support under Contract W911NF-16-3-0001 awarded by the Army Research Office (ARO). The government has certain rights in the invention.

BACKGROUND

Technical Field

This disclosure relates generally to techniques to distributed machine learning.

Background of the Related Art

Today, massive amounts of data are distributed across multiple geographic locations. To mine the data for useful analytics, it is necessary to communicate data to a centralized location, and to perform model training on the aggregated data. For such large-scale data movement, however, communication is often prohibitively expensive. In addition, often confidentiality requirements or privacy policies imposed at a particular location further restrict movement of raw data across sites.

Despite these logistics issues, it is known to provide distributed machine learning, wherein models are created over distributed data nodes. To this end, a cloud-hosted service may be used to fuse models that are generated by respective agents, where an agent trains a model locally using data available to the agent. The weights computed by each agent training the model locally are then delivered to the service, which then computes a weighted average of each of the weights. The process is iterated to produce a final model. Although this approach provides satisfactory results from certain types of functions (e.g., loss functions that are additive), the approach has the disadvantage in that it reveals the model to the service, which may not be trusted.

There remains as need to provide new approaches to distributed machine learning under data parallelism and, in particular, techniques that enable service providers to operate in a manner that preserves model secrecy.

BRIEF SUMMARY

The technique herein provides distributed learning using a network-accessible (e.g., cloud-based) fusion server, together with a distributed set of learning agents. Preferably, each learning agent performs learning (training) on a model using data local to the learning agent, and then it provides the resulting data to the fusion server in a privacy-preserving manner, namely, in a manner that ensures that the fusion server itself cannot determine relevant details regarding the model it is building. In this manner, fusion learning over a widely-distributed set of data is carried out without requiring the data to be communicated in the clear to a central location. The approach enables secure distributed machine learning using a distributed computing system comprising a set of agents, each of which has access to a local dataset, typically comprising labeled samples.

According to this disclosure, the fusion server provides coordination of the distributed learning and contributes to the model building, but in a manner that does not expose model details to the server. Thus, distributed learning is enabled in a secure and efficient manner, even where the fusion service is untrusted. In one embodiment, the agents are located in different locations in an enterprise (e.g., different data centers); in an alternative embodiment, the agents do not necessarily trust one another and may each be operating on behalf of a different enterprise. In operation, models are periodically generated or updated located, and sent to the fusion service, which then averages their parameters, all the while preserving confidentiality of the parameters as well as the underlying training datasets. In particular, preferably the fusion server implements a partial homomorphic cryptosystem and thus performs the fusion operation on encrypted parameters, as opposed to parameters that are available to the fusion server in the clear. In this approach, the fusion server coordinates the local learning agents to perform the distributed learning (e.g., to agree upon hyper-parameters of the model) but without the fusion server necessarily seeing any of the hyper-parameters or weights in the fusion process. This enables the fusion server to be used by multiple owners of sensitive information.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
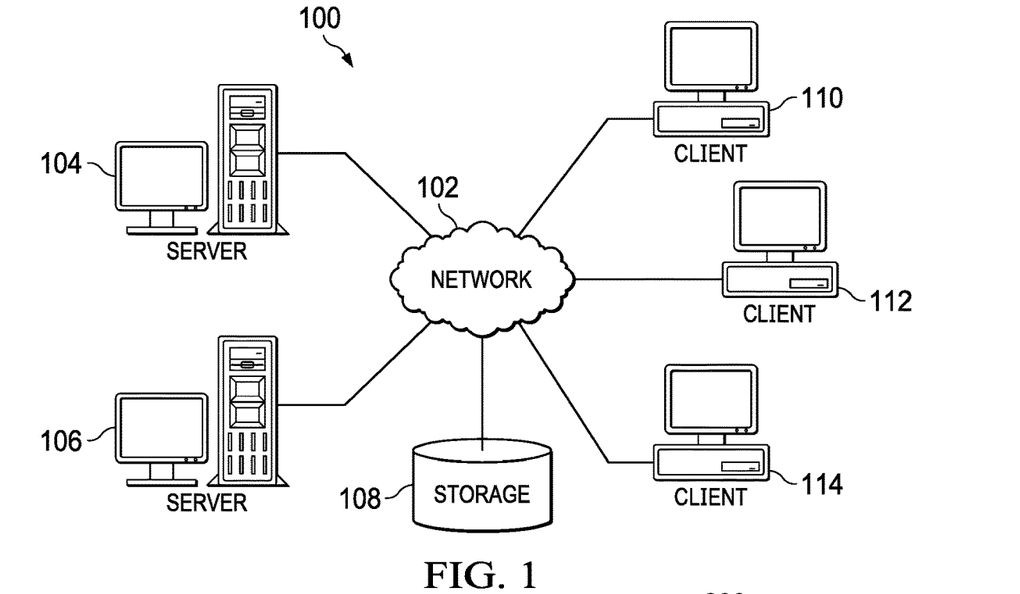
FIG. 1 depicts an exemplary block diagram of a distributed data processing environment in which exemplary aspects of the illustrative embodiments may be implemented.
Figure 2:
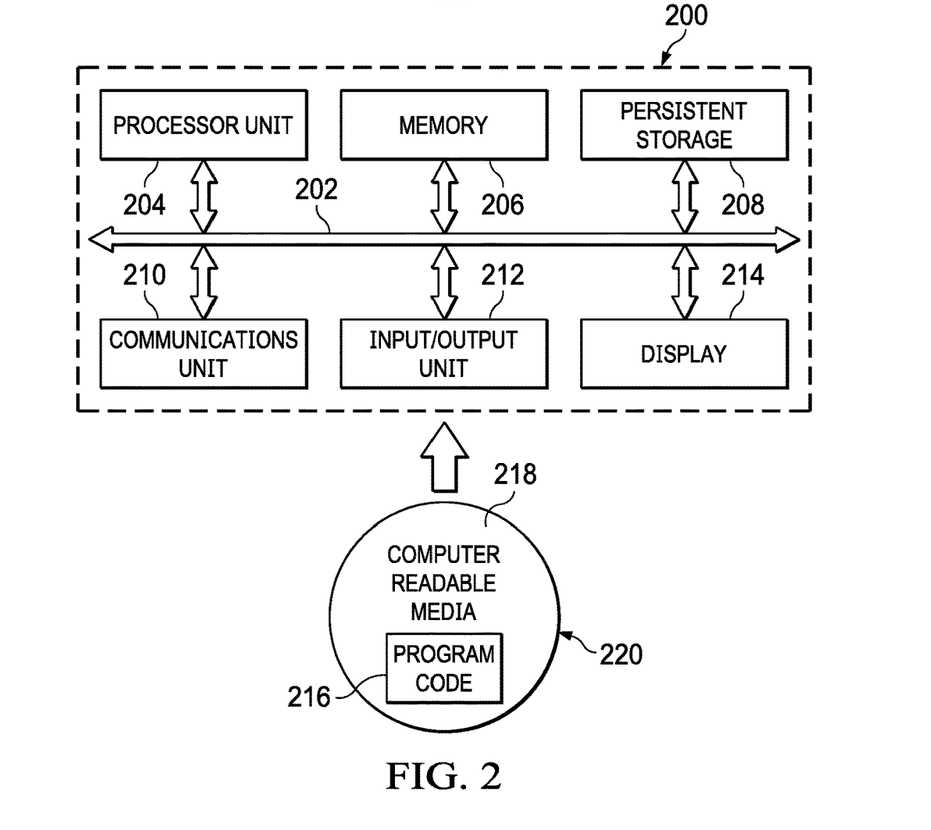
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212.

The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

The applications on the data processing system also can use native support for non-standard protocols, or private protocols developed to work on a TCP/IP network.

Cloud Computing Model

As described above, the distributed machine learning techniques of this disclosure preferably leverage computing elements that are located in a cloud computing environment. Thus, the following additional background regarding cloud computing is provided.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "The NIST Definition of Cloud Computing" by Peter Mell and Tim Grance, September 2011.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
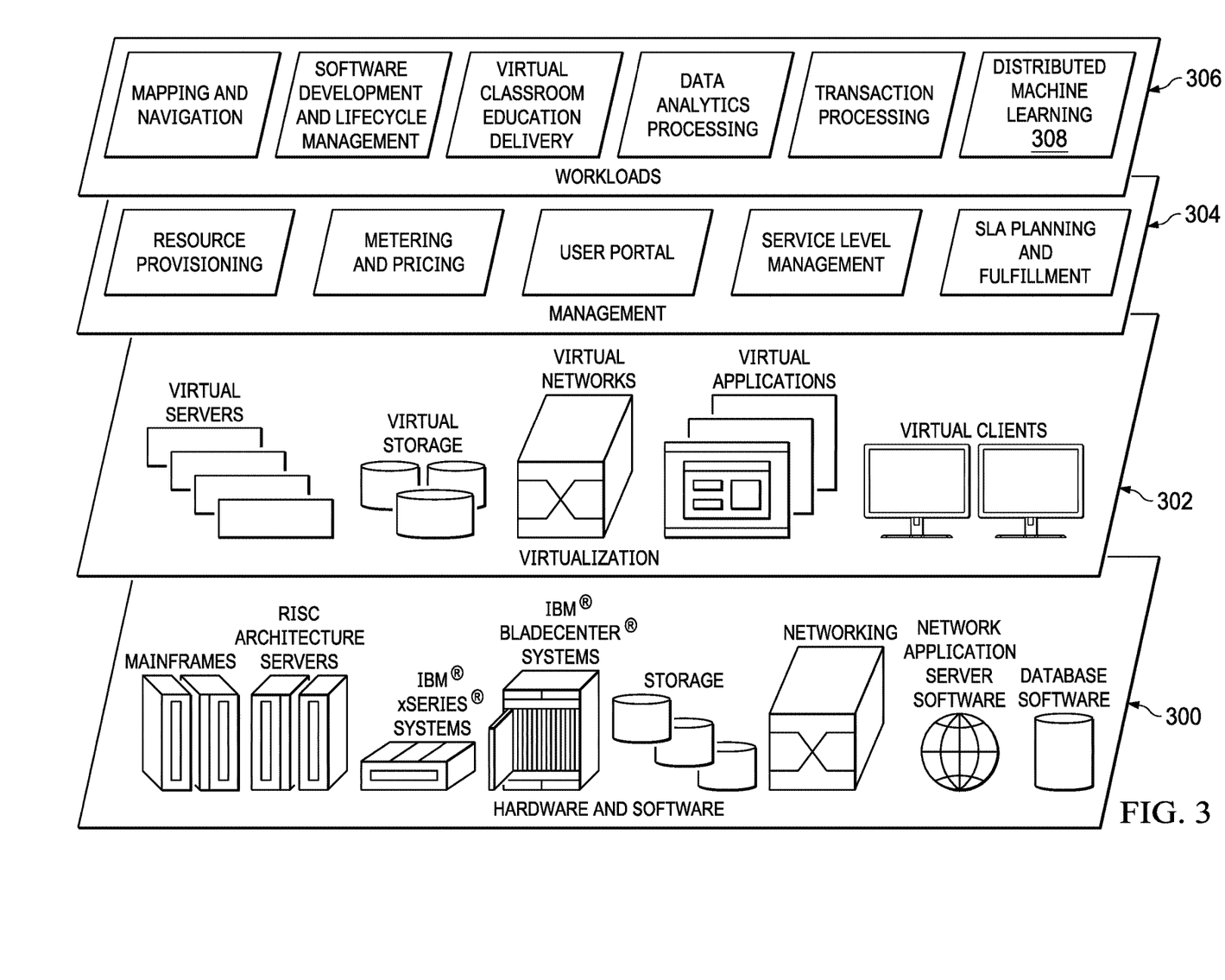
FIG. 3 depicts a cloud compute environment in which a fusion server of a secure distributed machine learning framework may be implemented according to this disclosure.

In a typical cloud computing environment, and as depicted in FIG. 3, a set of functional abstraction layers are provided. These include a hardware and software layer, a virtualization layer, a management layer, and a workload layer.

The hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

The virtualization layer 302 provides an abstraction layer from which the following examples of virtual entities may be provided: virtual servers; virtual storage; virtual networks, including virtual private networks; virtual applications and operating systems; and virtual clients.

The management layer 304 provides various management functions. For example, resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

The workloads layer 306 provides the functionality for which the cloud computing environment is utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, distributed machine learning 308.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

Distributed Machine Learning

Figure 4:
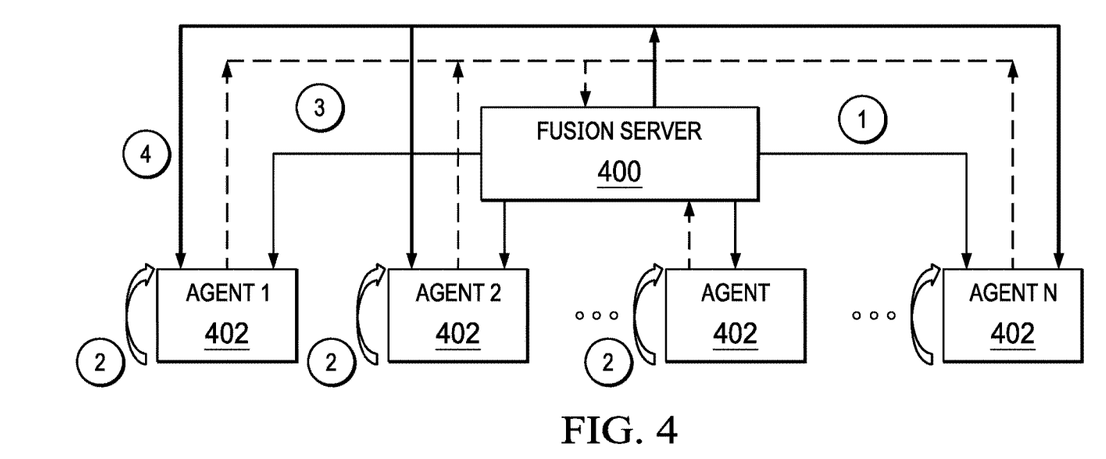
FIG. 4 depicts a distributed learning framework involving a fusion server and a set of learning agents.

An approach to distributed machine learning is depicted in FIG. 4. This system comprises a fusion server 400, and a number N of agents 402, sometimes referred to herein as learning agents. In this embodiment, each learning agent has access to a local dataset d typically consisting of labeled samples. Each agent has its own dataset. In a typical operation, a distributed learning process may be carried out as follows. At step (1), each agent 402 contacts the fusion server 400 to obtain hyper-parameters for training. In machine learning, a hyper-parameter is a parameter whose value is set before the learning process begins; in contrast, the values of other parameters are derived via the training. Typically, each agent 402 trains the same type of neural network. In a representative example, a model associated with an agent then is characterized by a parameter vector A=[$p_1 \ldots p_k$], which consists of several parameters. There are multiple agents in the system, with $A_i$ being a parameter vector given by agent i. At step (2), the $i^{th}$ agent trains the model on its local dataset d and such training typically is done by taking a mini-batch, which is a small subset of the overall training data, and in so doing the $i^{th}$ agent computes its parameter vector $A_i$. At step (3), each agent 402 sends the resulting parameters to the fusion server 400, which then computes an average for each parameter in the vector. The average may use different priorities (weights m) for different agents; for example, if agent i gets a weight $m_i$, then the average parameter vector computed by the fusion server is $\Sigma_i m_i A_i / \Sigma_i m_i$. At step (4), the fusion server 400 publishes the average parameter vector back to the agents 402. The steps (2)-(3) are then repeated for a given number of iterations until the learning is considered to be completed.

It has been shown that the above-described process leads to the same model that would have been created if all data was collected at a single location and used to train the model, at least for loss functions that are additive, namely, indicator loss functions (e.g., cross-entropy loss, norm-based loss, binary-cross entropy, and others). The approach, however, has the challenge that it reveals the model to the fusion server, typically a cloud-hosted service that may not be trusted by agents that may not themselves be located in the cloud. The technique of this disclosure addresses this problem.

Secure Distributed Machine Learning

Figure 5:
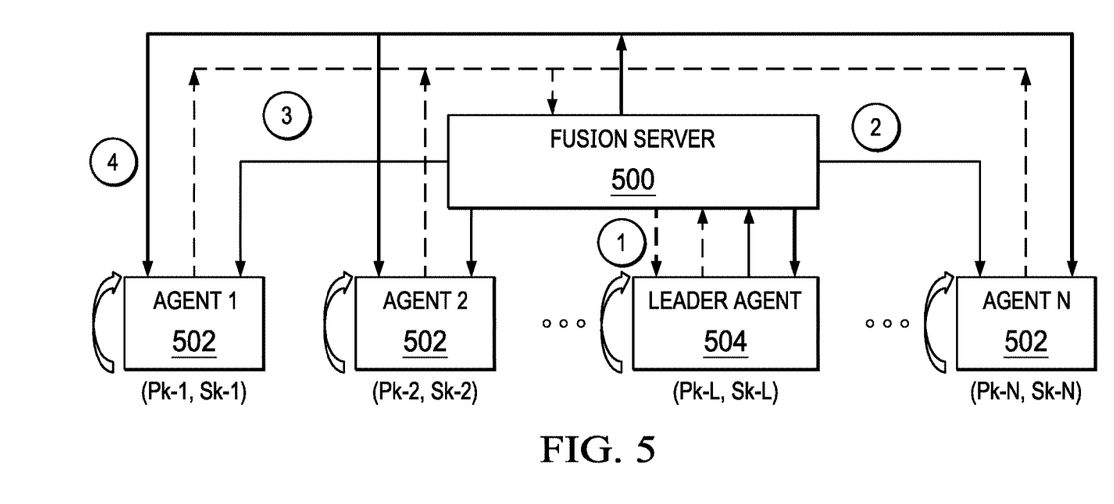
FIG. 5 depicts a preferred federated model training scheme using a set of geographically distributed agents each with their own local data set (i.e., under data parallelism) and being coordinated by a fusion server.

With the above as background, the following describes the subject matter of this disclosure. The basic system is depicted in FIG. 5. In this approach, as in FIG. 4, there is a fusion server 500, together with a set of agents 502. Preferably, the fusion server 500 is a cloud-hosted service. Each agent has a vector of model parameters on which it performs local training. An agent has a priority, or weight. An agent multiplies its parameter vector with a weight $w_{-i}$, encrypts the updated parameters, and shares them with the server.

In contrast with FIG. 4, however, in this embodiment one of the agents is designated by the fusion server 500 as a "leader" agent 504. As will be described, while the leader agent 504 operates to determine the parameters for secure fusion for all of the agents in the system, the fusion server 500 acts to coordinate the distributed machine learning among the agents and, in particular, in a secure manner that does not expose training data to the fusion server itself. Preferably, all agents 502 (other than the leader, which already knows them) initially obtain parameters (the "hyper-parameters") from the leader agent 504 but not directly; rather, the hyper-parameters determined by the leader agent are instead obtained via the fusion server 500 (which obtains them from the leader, as will be seen). Each agent 502 trains using its local data 506 and then passes the resulting parameters (in an encrypted form) back to the fusion server. The server 500 then fuses the encrypted parameters from all of the agents 502 for a next iteration of the learning. As described above in FIG. 4, this process is then iterated until convergence of the machine learning model or, more generally, until a learning session is deemed to be completed according to some criteria.

According to this disclosure, and as will be described, the model parameters are secured (preferably by encryption) to protect the privacy of the training data and, in particular, by a partial homomorphic encryption scheme (either additive or multiplicative, as will be seen) by which the fusion server operates on those encrypted parameters without deciphering them (and while they remain enciphered). This security model may be applied irrespective of the type of machine learning algorithm being implemented and, as noted, the approach allows for local training of model parameters, preferably using data local to a particular agent. Preferably, only encrypted parameters (for each local model) are shared with the fusion server. In this approach, there are no peer-to-peer communications between or among the agents that are involved in the distributed fusion algorithm, as communications flow through the central fusion server that coordinates the distributed learning.

Generalizing, the word "fusion" as used herein refers generally to the notion of combining (or "fusing") the updates (of the parameters) received from the various agents, albeit in a manner that does not expose the parameters themselves to the server. Thus, the entity (FIG. 5, server 500) that is tasked with performing this combining operation is referred to here interchangeably as the fusion server, the fusion manager, the parameter server or simply a central server. The server (which may be a single process or multiple processes) may execute on one or more physical or virtual machines. Typically, and as noted above, the fusion server is hosted in a cloud computing environment such as depicted in FIG. 3. Each agent typically is a computing entity, e.g., a data processing system, such as depicted in FIG. 2. The agents may be located in different data centers, and the agents do not necessarily belong to the same owning entity. Thus, in a general case, a first agent may be associated with a first enterprise (owner), while a second agent may be associated with a second enterprise distinct from the first enterprise.

As also previously noted, each agent typically has a data set local to the agent and that is used for the training at the local site. A data set associated with a particular agent typically differs from a data set associated with another agent. There may be any number of agents. One or more agents may also be co-located with one another. The notion of "agent" is not intended to be limited, as any computing entity (machine, device, appliance, program, process, execution thread, etc.) may carry out this functionality in whole or in part. Each agent may itself execute a computing cluster (e.g., CPUs, GPUs, etc.) to distribute the training (locally) of its local model. Thus, as used herein, an "agent" should be broadly construed to cover one or more computing entities executing locally against a local data set to train a model.

As noted above, the distributed or federated learning process is secured, even in the event of an untrusted or third-party fusion server. To this end, and to preserve secrecy, the distributed learning process preferably implements two (2) cryptographic mechanisms. A first cryptographic mechanism is a public key cryptosystem, which is used to secure the communications between a particular agent and the fusion server itself; a second cryptographic mechanism preferably implements a partial homomorphic cryptosystem by which only encrypted parameters for fusion are sent to (and acted upon by) the model fusion server 500. Homomorphic encryption allows computation on ciphertexts, generating an encrypted result which, when decrypted, matches the result of the operations as if performed on the plaintext. Homomorphic encryption enables computation on encrypted data. Partially homomorphic cryptosystems are a type of homomorphic encryption but are defined over a group, and that support just a single operation on the encrypted data (as opposed to many such operations). Partial homomorphic encryption may be based on various underlying cryptographic schemes including, without limitation, unpadded RSA, El-Gamal, Benaloh, Paillier, and others.

Because partial homomorphic encryption only applies to a single operation (namely, addition or multiplication), however, a preferred fusion process herein is structured so only that one type of operation (in the preferred embodiment, element-wise multiplication) takes place in the cloud (on the fusion server). Each of the local sites performs actual training (on its local data set), and the entire approach is carried out without any information leakage because the fusion server performs the fusion on encrypted parameters, i.e., without first deciphering data to recover the parameters themselves. As noted, the approach does not require that any individual agent trusts the fusion server. Further, the approach provides a security scheme that can be applied to any general neural network model that is being trained by the agents.

With reference again to FIG. 5, the federated model training scheme of this disclosure is now described. As noted above, this scheme uses a set of agents 502 (which in whole or in part may be geographically-distributed) each with their own local data set 506. As noted, there is no restriction on the number of agents, and an agent may be included in the scheme on-demand (e.g., as needed, or upon failure of a given agent). Because the agents need to agree on the keys used for homomorphic encryption, preferably the following strategy is implemented.

The agents participating in the distributed machine learning session register with the fusion server. Using a public key cryptosystem, each agent 502 generates a public/private pair of keys for secure communication, and each agent provides its public key (or a certificate that include the public key) to the fusion server. An agent may in the alternative provide the fusion server with a location (e.g., a URL) at which its public key (or certificate) may be retrieved by the fusion server. Because each agent 502 implements its own public key cryptosystem, a key pair associated with an agent is unique to that agent. The fusion server obtains all of the public keys (from each of the respective agents) and, at step (1), selects one of the agents to act as the "leader." A leader election algorithm may be used for this purpose, although in the alternative the fusion server may select the leader agent using any deterministic scheme. The selection of the leader agent by the fusion server may be based on other criteria, such as agent-reported load, latency, time-of-day, a configured policy, or otherwise. In one embodiment, the fusion server selects a leader randomly. Thus, the fusion server selects the leader from the set and then notifies the agents of the identity of the leader agent. The fusion server keeps track of the fusion session (e.g., counting the number of agents, keeping track of their public keys, etc.). Importantly, the fusion server also provides the leader agent with the public keys of the other agents.

At step (2), the leader agent 504 provides management information to the fusion server. In particular, there are a number of instances of the management information (which is all the same), with each instance being encrypted with a public key of a particular agent. In other words, the leader agent generates the management information and then encrypts that information with each of the public keys that were provided to the leader agent by the fusion server. Each instance of the management information in turn (and as shown by the dotted line) is then communicated from the fusion server to the other agents. Thus, fusion server takes a first instance of the management information (secured by the first agent's public key) and sends it to the first agent; it likewise takes a second instance of the management information (secured by the second agent's public key) and sends it to the second agent, and so forth.

The management information typically comprises hyperparameters for the learning session including a weight (as noted above, a priority) for each agent, and the types/parameters of a desired partial homomorphic algorithm (e.g., unpadded RSA, El-Gamal, Benaloh, Paillier, etc.) that the fusion server will use for the fusion. Generalizing, the management information comprises a set of learning parameters, together with information identifying the partial homomorphic cryptosystem. The leader agent also determines the weights (the priorities) to be assigned to each of the agents, and the leader ensures that the weights sum to unity (i.e., 1). As depicted, at step (2) the fusion server distributes this information (albeit encrypted with the corresponding public key) to each agent. Stated another way, the leader agent in effect creates multiple copies of the management information, with each instance being wrapped by a different public key, as each of the public keys of the agents are different from one another.

At step (3), each agent computes its local model. To this end, an agent receives the management information encrypted with the agent's corresponding public key. The agent decrypts that package (using the private key of its associated key pair) and recovers the management information. At this point, each agent now knows the homomorphic encryption algorithm, the weight assigned by the leader, as well as the same hyper-parameters. Each agent locally computes the product of its weight $m_i$, and each of the entries in a model parameter vector $[p_1, \ldots p_k]$. Each of these entries are then exponentiated, and the result (an encrypted model description comprising a set of encrypted parameters) is then sent back to the fusion server.

At step (4), the fusion server then performs an element-wise multiplication or addition operation on the parameters of the encrypted model description that the fusion server receives from each of the agents. The choice of the operation (multiplication or addition) depends on the nature of partial homomorphic encryption that is used. In particular, consider a specific fusion algorithm, such as a weighted averaging of model parameters. In a (fully) homomorphic encryption scheme, the fusion algorithm uses both multiplication and addition operations over parameters. A partial homomorphic encryption scheme, however, only allows for one of these operations to be performed on ciphertexts; thus, the other operation has to be done in the clear. The technique of this disclosure overcomes any issue in this regard by splitting the operations (whether multiplication or addition) between the agents and the fusion server. For example, in one embodiment the agents (using the management information provided by the leader via the server) multiply the model parameters with their respective weights $m_i$ before sharing the update. Thus, the server only needs to generate the encrypted addition of the parameters (and for a specific instance of the partial homomorphic algorithm, e.g., Paillier Encryption, this is achieved by element-wise multiplication of the corresponding parameter ciphertexts).

Because a partial homomorphic cryptosystem is used, the fusion server is configured to compute this function (over the encrypted parameters of the learning models received from the set of agents) without first exposing the parameters of the learning models, i.e., by deciphering the information received from the agents. Using the the respective public key cryptosystem for each agent, the fusion server then sends the encrypted updated model (namely, the vector that results from this multiplication or addition, as the case may be) back to the agents. Each agent decrypts the results, saves the resulting data in a log, and then recreates the model parameters of the fused model system. Steps (3) and (4) are then repeated until the model converges.

By using the above-described technique, and because only encrypted parameters are shared with the fusion server, that server never sees the raw model parameters themselves. It then uses a partial homomorphic algorithm to fuse the models together. In this manner, and by applying partial homomorphic encryption to each locally-updated model, the approach herein protects the privacy of the training model and the underlying training data. As described, the system fuses models trained on local data from several agents into an aggregate model in a secure manner. The central fusion server coordinates the distributed learning process but details of the model and the underlying training data are not exposed to the server.

In other embodiments, the parameters are encrypted in more than one encryption scheme, e.g. the same parameters are encrypted using one or more of an additive partial homomorphic scheme, a multiplicative partial homomorphic scheme, and an order-preserving homomorphic scheme. All versions of the encrypted parameters are then sent to the fusion server, which performs the necessary operations on the provided parameters, such as one or more of order checking operations, addition operations or multiplication operations. Thus, and depending on how the encryption scheme is configured, the fusion server performs additive operations after checking on the order of the provided parameters, performs additive operations after sorting all the parameters in an increasing or decreasing order, and/or performs multiplicative and additive operations after sorting all the parameters in increasing or deceasing order. All of these embodiments of the fusion operation may leverage the techniques of this disclosure.

Figure 6:
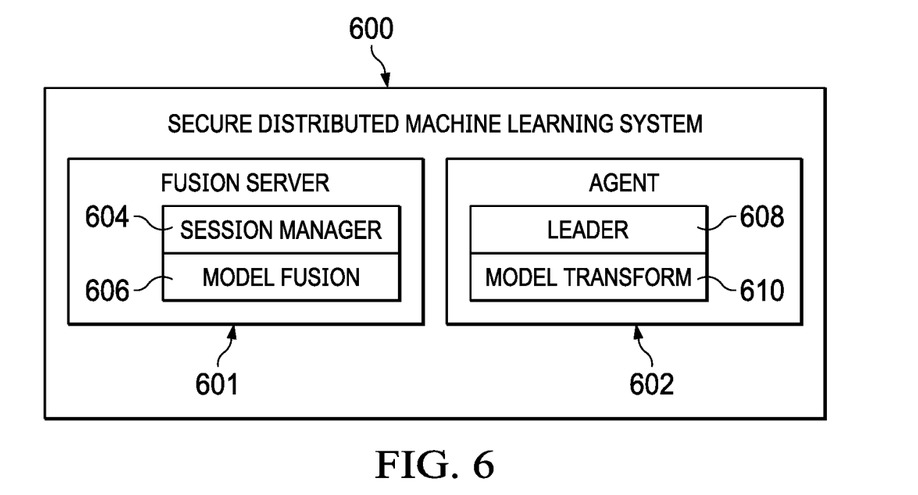
FIG. 6 depicts a representative implementation of the fusion server and each agent in the distributed machine learning system of this disclosure.

FIG. 6 depicts a representative implementation of a secure distributed machine learning system 600 comprising fusion server 601, and an agent 602. As depicted, the fusion server 601 comprises a fusion session manager sub-system 604, and a model fusion sub-system 606. The fusion session manager sub-system 604 keeps track of each fusion sessions, its leader, and the agent public keys. The fusion session manager sub-system 604 also selects the leader agent, receives and encrypts the management information (using each agent's respective public key), and provides the management information sets to the agents. The model fusion sub-system 606 is configured to take each model (and in particular the parameters) provided by each respective agent to the fusion server, and processes them together for the fusion operation in the manner described above. As also depicted, an agent 602 has a leader sub-system 608 which (when selected) creates the hyper-parameters and required weights for model fusion process. The agent 602 also includes a model transformation sub-system 610, which is configured to change a model into a format that can be used for partial homomorphic operations at the fusion server. In particular, the model transformation sub-system 610 at the $i^{th}$ agent does the following: (a) performs element-wise multiplication of the model parameters with the received weight $m_i$, and (b) performs encryption of the model parameters for sharing with the server.

Each sub-system typically is configured in software, namely, as a set of computer program instructions held in computer memory and that are executed by one or more processors, e.g., in a physical or virtual machine.

The technique of this disclosure provides significant advantages. The system fuses models trained on local data from several agents into an aggregate model and in a secure manner, even with respect to the central fusion server that coordinates the distributed learning process itself. Preferably, each of set of learning agents that are typically distributed from one another initially obtain parameters for a model from the fusion server. Each agent trains using their local data. The parameters that result from this local training (for a current iteration) are then passed back to the fusion server and fused in a secure manner, e.g., using a partial homomorphic encryption scheme. In particular, the server fuses the encrypted parameters from all the agents, and then shares the encrypted results with the agents for a next iteration. In this approach, the model parameters are secured using the encryption scheme, thereby protecting the privacy of the training data.

The fusion server thus provides for secure coordination of the distributed learning and contributes to the model building itself, but in a manner that does not expose model details to that server. Thus, distributed learning is enabled in a secure and efficient manner, even where the fusion service is untrusted. The distributed machine learning may be carried out even with at least some agents (in the agent set) located in different locations in an enterprise (e.g., different data centers); in an alternative embodiment, distributed learning is enabled although the agents may each be operating on behalf of a different enterprise. The approach herein enables the locally-generated learning models to be periodically generated or updated locally, and sent to the fusion service, which then averages their parameters, all the while preserving confidentiality of the parameters as well as the underlying training datasets. This enables the fusion service to be used by multiple owners of sensitive information.

The above-described technique may be implemented using any machine learning algorithms or computations that are capable of being distributed in the manner described.

A new leader agent may be selected for each learning session, and a particular leader agent may be replaced by another agent in a failover arrangement.

This subject matter may be implemented in whole or in part as-a-service. Thus, in one typical implementation, the fusion server operates in the cloud and provides the fusion services. Generalizing, the secure distributed machine learning (ML) functionality may be provided as a standalone function, or it may leverage functionality from other ML-based products and services.

The functionality of the fusion server or the agents described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, security systems, web portals, federated systems, and the like. As also noted, the techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the fusion server and each agent are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., machine learning systems, security incident and event management (SIEM) systems, other security systems, as well as improvements to automation-based cybersecurity analytics.

In addition to training for neural networks as described, the above-described process also can be used for other types of Artificial Intelligence (AI) models, such as clusters or decision trees, or Gaussian Mixture Models. In most of these cases, the fusion server needs to compute an average of the weights passed to it. In some cases, and in addition to the average computation, the fusion server may also need to compare the order of weights passed to it (e.g., when clustering centroids are passed to it).

The invention claimed is:

1. A method of secure distributed machine learning, comprising:
   selecting a leader agent from a set of agents, each agent having associated therewith a cryptographic key;
   providing management information derived by the leader agent to each other agent in the set, the management information comprising a set of learning parameters, together with data associated with an encryption scheme, wherein each such other agent receives the management information encrypted by its corresponding cryptographic key;
   receiving from each agent in the set encrypted parameters of a learning model, the encrypted parameters of the learning model having been computed by the agent against a dataset local to the agent and based on the management information; and
   computing a function over the encrypted parameters of the learning models received from the set of agents to generate a fused learning model, wherein the function is computed without first exposing the parameters of the learning models.

2. The method as described in claim 1, wherein the learning parameters are hyper-parameters for learning and include a weight assigned to a given agent by the leader agent, wherein weights assigned by the leader agent to all of the agents in the agent set equal 1.

3. The method as described in claim 1, wherein the encryption scheme is a partial homomorphic encryption scheme.

4. The method as described in claim 3, wherein the partial homomorphic encryption scheme is one of: an additive partial homomorphic encryption scheme, a multiplicative partial homomorphic encryption scheme, and an order-preserving partial homomorphic encryption scheme.

5. The method as described in claim 1, wherein the cryptographic key is a public key of a public key pair, the public key pair having an associated private key, the associated private key adapted to recover the management information.

6. The method as described in claim 1, further including receiving registration information from each agent, the registration information for a particular agent including the agent's cryptographic key.

7. The method as described in claim 1, further including re-distributing the fused learning model to the set of agents for a next iteration of machine learning.

8. An apparatus associated with a fusion service, comprising:
   a hardware processor;
   computer memory holding computer program instructions executed by the hardware processor to provide secure distributed machine learning by a set of agents, the computer program instructions configured to:
   select a leader agent from a set of agents, each agent having associated therewith a cryptographic key;
   provide management information derived by the leader agent to each other agent in the set, the management information comprising a set of learning parameters, together with data associated with an encryption scheme, wherein each such other agent receives the management information encrypted by its corresponding cryptographic key;
   receive from each agent in the set encrypted parameters of a learning model, the encrypted parameters of the learning model having been computed by the agent against a dataset local to the agent and based on the management information; and
   compute a function over the encrypted parameters of the learning models received from the set of agents to generate a fused learning model, wherein the function is computed without first exposing the parameters of the learning models.

9. The apparatus as described in claim 8, wherein the learning parameters are hyper-parameters for learning and include a weight assigned to a given agent by the leader agent, wherein weights assigned by the leader agent to all of the agents in the agent set equal 1.

10. The apparatus as described in claim 8, wherein the encryption scheme is a partial homomorphic encryption scheme.

11. The apparatus as described in claim 10, wherein partial homomorphic encryption scheme is one of: an additive partial homomorphic encryption scheme, a multiplicative partial homomorphic encryption scheme, and an order-preserving partial homomorphic encryption scheme.

12. The apparatus as described in claim 8, wherein the cryptographic key is a public key of a public key pair, the public key pair having an associated private key, the associated private key adapted to recover the management information.

13. The apparatus as described in claim 8, wherein the computer program instructions further include computer program instructions configured to receive registration information from each agent, the registration information for a particular agent including the agent's cryptographic key.

14. The apparatus as described in claim 8, wherein the computer program instructions further include computer program instructions configured to re-distribute the fused learning model to the set of agents for a next iteration of machine learning.

15. A computer program product in a non-transitory computer readable medium for use in a data processing system to provide secure distributed machine learning, the computer program product holding computer program instructions that, when executed by the data processing system, are configured to:
   select a leader agent from a set of agents, each agent having associated therewith a cryptographic key;
   provide management information derived by the leader agent to each other agent in the set, the management information comprising a set of learning parameters, together with data associated with an encryption scheme, wherein each such other agent receives the management information encrypted by its corresponding cryptographic key;
   receive from each agent in the set encrypted parameters of a learning model, the encrypted parameters of the learning model having been computed by the agent against a dataset local to the agent and based on the management information; and compute a function over the encrypted parameters of the learning models received from the set of agents to generate a fused learning model, wherein the function is computed without first exposing the parameters of the learning models.

16. The computer program product as described in claim 15, wherein the learning parameters are hyper-parameters for learning and include a weight assigned to a given agent by the leader agent, wherein weights assigned by the leader agent to all of the agents in the agent set equal 1.

17. The computer program product as described in claim 15, wherein the encryption scheme is a partial homomorphic encryption scheme.

18. The computer program product as described in claim 17, wherein the partial homomorphic encryption scheme is one of: an additive partial homomorphic encryption scheme, a multiplicative partial homomorphic encryption scheme, and an order-preserving partial homomorphic encryption scheme.

19. The computer program product as described in claim 15, wherein the cryptographic key is a public key of a public key pair, the public key pair having an associated private key, the associated private key adapted to recover the management information.

20. The computer program product as described in claim 15, wherein the computer program instructions further include computer program instructions configured to receive registration information from each agent, the registration information for a particular agent including the agent's cryptographic key.

21. The computer program product as described in claim 15, wherein the computer program instructions further include computer program instructions configured to re-distribute the fused learning model to the set of agents for a next iteration of machine learning.

22. A secure distributed machine learning system, comprising:

a server; and a set of agents;

a leader subsystem associated with at least one agent in the set of agents and configured to derive a set of learning parameters, together with data associated with a partial homomorphic encryption scheme;

the server being configured to receive the set of learning parameters and the data, and to securely provide the learning parameters and the data to each of the other agents;

each agent being configured to apply the learning parameters and the data against a data set associated with the agent to generate a set of parameters;

the server being further configured to receive from each agent an encrypted set of parameters generated by the agent, and to compute an updated set of parameters without first deciphering any of any encrypted set of parameters, the updated set of parameters being computed using the partial homomorphic encryption scheme.

23. The system as described in claim 22 wherein the server is untrusted.

24. The system as described in claim 22 wherein the server is further configured to re-distribute the updated set of parameters to enable a next iteration of machine learning by the set of agents.

* * * * *